United States Patent [19]

Boeck et al.

[11] Patent Number: 4,774,402
[45] Date of Patent: Sep. 27, 1988

[54] MISSION READINESS OF OPTRONICAL TRACKING AND GUIDING SYSTEMS

[75] Inventors: Hans-Joachim Boeck, Delmenhorst; Juergen Fryen, Weyhe, both of Fed. Rep. of Germany

[73] Assignee: MBB GmbH, Bremen, Fed. Rep. of Germany

[21] Appl. No.: 9,535

[22] Filed: Feb. 2, 1987

[30] Foreign Application Priority Data

Jan. 31, 1986 [DE] Fed. Rep. of Germany ....... 3602910

[51] Int. Cl.$^4$ .......................... G01S 3/78; G12B 7/00; G12B 5/00; G02B 7/11
[52] U.S. Cl. ................................ 250/201; 250/203 R; 73/865.6; 356/138
[58] Field of Search ...................... 250/201 R, 203 R; 356/256, 138, 141, 152; 73/865.6

[56] References Cited

U.S. PATENT DOCUMENTS 4,622,458 11/1986 Boeck et al. .................... 250/203 R Primary Examiner—Edward P. Westin
Assistant Examiner—Charles Wieland
Attorney, Agent, or Firm—Ralf H. Siegemund

[57] ABSTRACT

Optronic tracking and guiding instruments are maintained in a readiness state by simulating various conditions including mechanical loads and, possibly, temperature variations for obtaining a set of corrective data which is then used for compensating possible errors during a real live mission. The compensation involves particularly focusing and exposure time control.

3 Claims, 4 Drawing Sheets

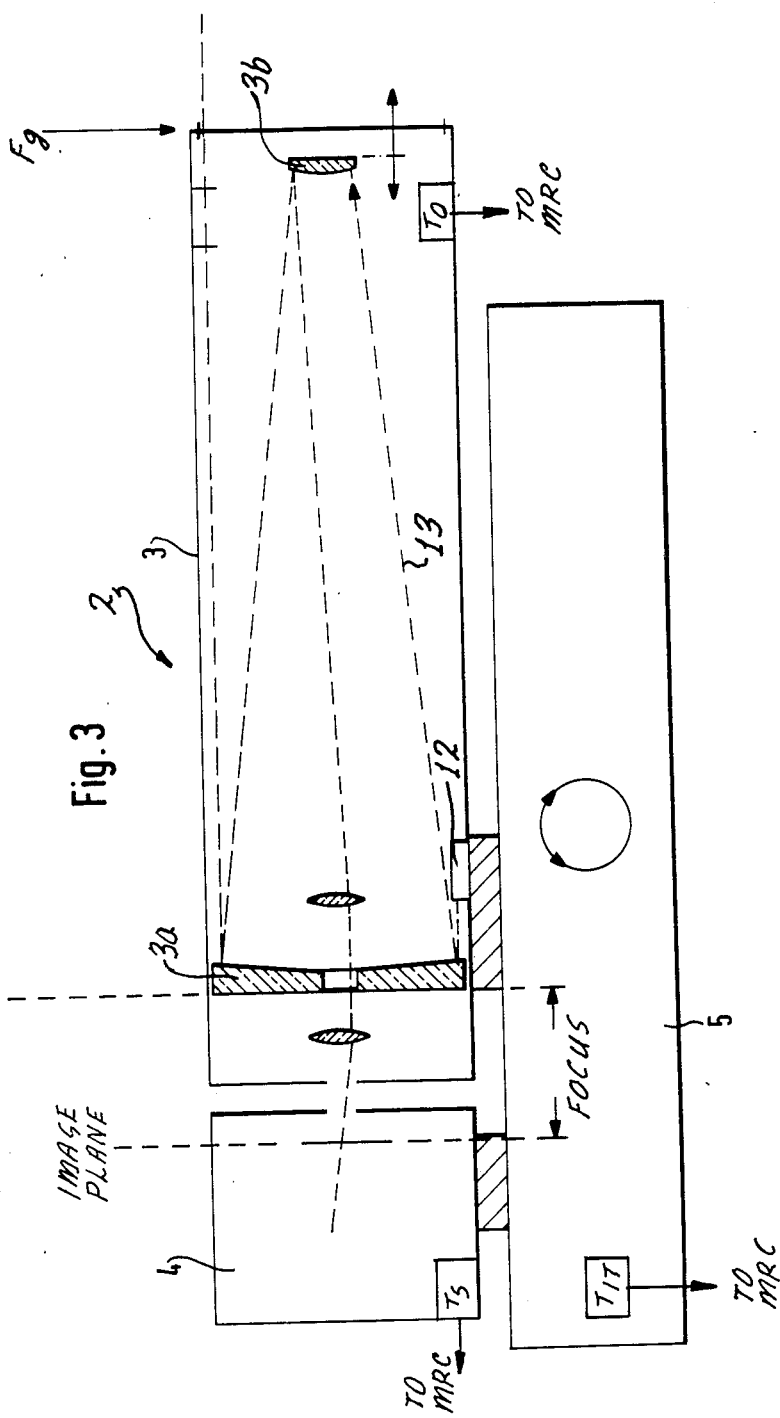

MISSION READINESS OF OPTRONICAL TRACKING AND GUIDING SYSTEMS

BACKGROUND OF THE INVENTION

The present invention relates to ensuring an operational readiness state of optical-optoelectronic (or just optonic) instruments for use in tracking, monitoring and guiding systems. Optic-electronic sensor systems are to an increasing extent used for commercial, civilian and military purposes. A system of this type is, for example, shown in U.S. Pat. No. 4,622,458. The sensor system provides for the acquisition of data related to tracking, monitoring and guiding. Herein sensor systems have been used in the past which were developed basically for static or quasistatic, i.e. slowly varying conditions, such as operational (boundary) conditions. For example, more or less constant temperatures have been assumed and of the optical system involved can be deemed basically at rest.

Modern systems of the type to which the invention pertains are used usually in open air and are thus exposed to both radiation of the sun as well as any outbound radiation which means that rather high temperatures as well as large temperature variations may obtain. Extreme thermal conditions may easily lead to acquisiton errors and even outright failure of the respective mission involved. Added to this is the possibility of strong mechanical loads, for example, rapid accelerations during target tracking by the equipment, particularly when the target moves fast. Moreover these systems are frequently used under conditions wherein the tracked and guided object covers large distances, develops high speeds, and is capable of a high degree of maneuverability and acceleration, during path tracking. All this poses significant demands on the tracking equipment, specifically on the accuracy of focusing and maintaining critical exposure times.

DESCRIPTION OF THE INVENTION

It is an object of the present invention to provide new and improved operations which makes sure that optical electronic (optronical) instruments designed and provided for the purposes of tracking, guiding and monitoring the progress of objects, remain operational even under severe conditions such as outlined above, including severe ambient conditions as well as conditions which, on account of high relative possibly nonuniform speeds between tracking device and the object being tracked.

In accordance with the preferred embodiment of the present invention it is suggested to provide a mission readiness computer cooperating with particular measuring units yielding data which are to be compensated in real time, to offset errors attributable to temperature variations and/or accelerations; predictable missions parameter combinations are produced which in pre-mission simulations or quasi real game operations are parameter combinations used for correcting, specifically, focusing and exposure.

Specifically, through calibration procedure in terms of mission simulation, data are acquired initially by the MRC and stored. These data are acquired by way of simulation of tracking, e.g. fictional objects, but, as far as the equipment is concerned, they affect the equipment just as if there were a real mission. These data are then used during subsequent, real missions, for running real time compensation of effects, ambient temperatures and, e.g. accelleration have, on the tracking instrument and its mount. The MRC will optimize focusing and exposure speed in dependence upon the different temperatures in different locations of the equipment, as well as in dependence upon different mechanical load conditions. An optically included hair cross is used for these calibrations for acquiring corrective data that represents deviations of the hair cross as projected into the tracker and the true optical axis of the latter.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates in two parts (FIG. 1a and FIG. 1b) certain principal aspects underlying the practicing of the invention in accordance with the best mode thereof;

FIG. 3 illustrates the principal of cross hair projection in a telescoping system as well as aspects of temperature control;

Proceeding now to the detailed description of the drawings the inventive features which broadly speaking came into play will develop as follows. The device whose readiness is to be monitored is, for example, a piece of tracking equipment as disclosed and described with reference to FIG. 3 of U.S. Pat. No. 4,622,458, of common assignee. The content of this reference is incorporated by reference in the present disclosure. This tracking system includes an optronic device such as a TV camera system, possibly a monochrome high quality camera fitted with a controllable shutter such as a rotating mechanical shutter, possibly with additional aperture control of the tracking optics. The shutter is under an exposure control of the shutter speed, and there may be iris or diaphragm control. In addition, the camera includes drive structure for automatic focusing. FIGS. 1 and 1b show schematically the TV camera 2 on a support 5, respectively corresponding to element 28 and the mounting structure for that element in FIG. 3 of the above-referenced patent.

In order to prepare such equipment for a particular mission, details thereof have to be considered, and here particularly, and as a starting point, the expected loads and any potential interference with the instrumentation have to be considered which may vary from mission to mission. To a considerable extent, these potential problems depend on the relative position of the measuring instrument relative to the path of the object to be tracked. From a general point of view two extreme conditions are depicted in FIG. 1.

Figure 1A:
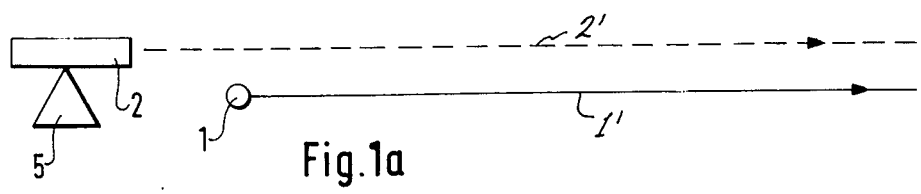
In FIG. 1a the conditions are such that the optical axis 2' involved in the tracking package is arranged in parallel to the expected object (1) path 1' while, as per FIG. 1b, the optical axis is arranged generally transversely to the object track 1'. Of course, mixed situations of this type are not only feasible but normal; these two situations are the two extreme cases.
Figure 1B:
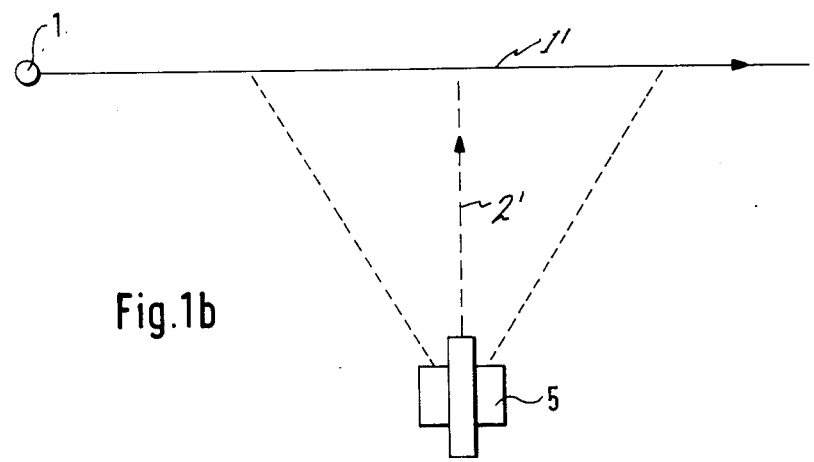

In the first case, as per FIG. 1a, and in the case of a strongly accelerating object 1 to be tracked there will be a considerable demand on focusing. In the second case of FIG. 1b, the exposure control is dominant on account of, possibly, strongly varying background conditions against which the object 1 is tracked.

In order to make sure that for a given set of parameters such as filter, filter sensitivity, position of the tracking equipment and so forth for a particular mission the requirements for the limits of the depth of field as well as the tolerance range for illumination are maintained, the mission is previously run through in the form of a game or simulation. During this simulation the system is controlled externally so that it will behave as if instrumentation 2 follows and tracks an object 1 just as it will do or is supposed to do during a real life mission. During this synthetic or simulated mission, the exposure of the TV camera and its focusing devices are monitored so as to determine whether or not any given tolerance limits are exceeded. If there is such an exceeding in values, then the system operating parameters, i.e. the parameters that determine, e.g. any speed of adjustment, adjustment range, etc., will be corrected. The simulation and correcting procedure or cycle is run through in an iterative fashion until the instrumentation system will fulfill the test conditions of the simulated mission, i.e. all of the relevant parameters are now remaining within the prescribed limits.

Figure 2:
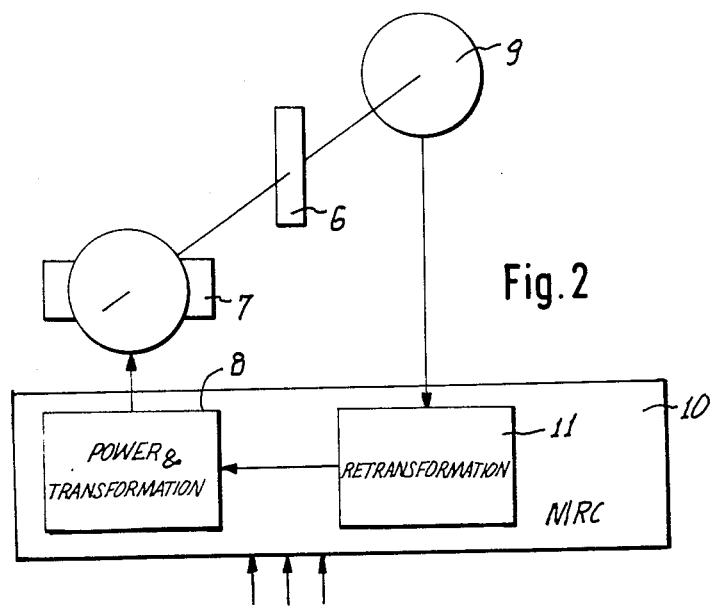
FIG. 2 is a block diagram for focusing or an exposure control device as they are incorporated in operations in accordance with the preferred embodiment of the present invention.

In order to facilitate ascertaining the tolerance range of focusing one uses the respective distance values R between the instrument (2-5) and the (now simulated) object for an immediate and direct control, for example, of focusing. In FIG. 2, reference numeral 6 may refer to focus adjustment in the camera 2. The adjustment of the optical system is carried out by means of a motor 7. This motor 7 is under control of the focusing control unit 8 which, basically, transforms distance values such as R into adjusting values (electrical signal) for the motor 7. A feedback, position indicator 9, responds to the focusing adjustment and feeds back in any instant the actual adjusted focus that was carried out by the focusing unit 6. A circuit 11 retransforms that position indication into a distance value. These circuits 8 and 11, moreover, pertain functionally to the mission readiness computer 10. The MRC computer receives from external sources, such as an adjustment and operational panel or from automated equipment multiple inputs, indicated generally, including the desired focusing distance R.

The MRC 10 provides a comparison within a given look-up table stored in a suitable memory portion of the MRC to see whether or not the adjusted actual distance value V remains within the depth of field as per that table for the desired value R. As stated, the transformation of linear distance values R into focusing non-linear adjusting values and vice versa are also to be carried out by the MRC. The MRC may also receive the temporal derivative of the focusing distance R being a speed value that represents the relative speed between tracking and the object being tracked which, as shown in FIG. 1a, may be quite large. Additionally, predicted changes of the focussing distance $R_v$ will also be fed to that input in anticipation of expected changes in R which is important for fast running measuring procedures. Procedurally then, the MRC 10 establishes mission readiness. If the permissible range limit are exceeded, i.e. if, for example, the focusing value as fed back by 9 and retransformed into a distance value by circuit 10, goes beyond the values as per the depth of field table, the focusing unit must be adjusted as to its operating parameters.

Different instruments will be controlled with the same physical distance and range value R. These include multispectral and multifocal aspects of the different pieces of instruments. In order to reduce the power necessary for moving the focusing equipment 6 and, therefore, in order to reduce the weight of the adjusting instrument equipment (7, 6, 9), generally, temporal changes in the distance $R_v$ are fed to the focusing input.

FIG. 2 can also be interpreted as shutter control device where 7 moves a rotary shutter and 9 determines, e.g. the exposure time. An input to MRC 10 determines the requisite exposure time under (simulated) varying conditions, the output 9 then simply represents the effeciency of exposure time tracking and the MRC 10 determines whether or not any lag remains within the exposure time tolerances, if not appropriate adjustments are made.

In all these instances, correction of the equipment is obtained through iterative process, wherein simulation alternates with adjustment. This then takes care implicitely of variable mechanical loads resulting from and occurring during simulated tracking procedure. Other variations, such as temperature differentials, within the equipment can be simulated separately.

Figure 4:
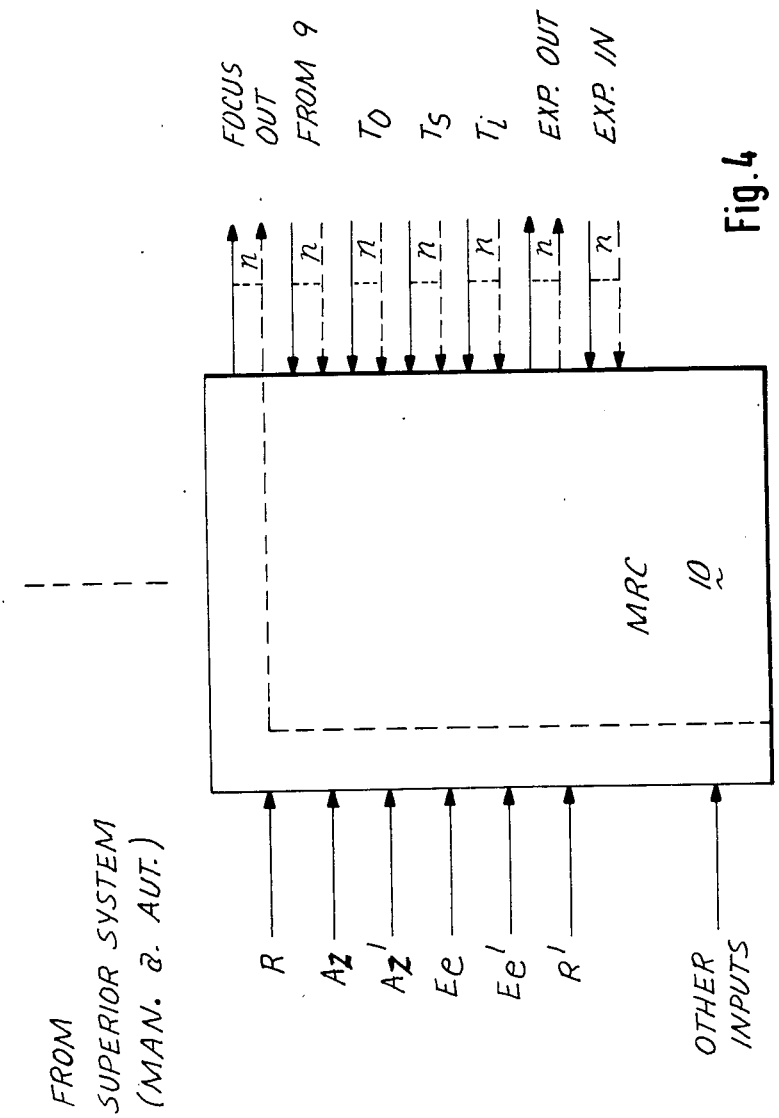
FIG. 4 is a block diagram for a mission readiness computer.

The temperature changes variations and high temperatures particularly in the optic 3 the sensors 4 and particularly in the instrument carrier 5 deterministically affect the focusing. The sensor 4 is presently assumed to be a TV camera, but the invention can, of course, be practiced with other sensors. For this reason the temperatures $T_o$ in the telescope tube, the temperature $T_s$ in the sensor 4 and the temperature $T_i$ in the instrument carrier 5 are measured as shown in FIG. 3, and the measuring values are fed also into the MRC 10 as shown in FIG. 4. The MRC processes these values in conjunction with stored, rated and predetermined (permissible) values, being, in fact, instrument data such that for all permissible temperature combinations the focusing control is and remains correct to ensure adequate quality of imaging and image representation.

Another factor to be considered is, alternating and/or variable mechanical loads; this is due to elevation dependancy, variation in gravity and other factors such as acceleration and deceleration all acting on the instruments and interfering to some extent with their operation. Implicitly, these mechanical loads have been considered already by way of simulating tracking. However, other aspects are relevant here to be developed next.

Figure 5:
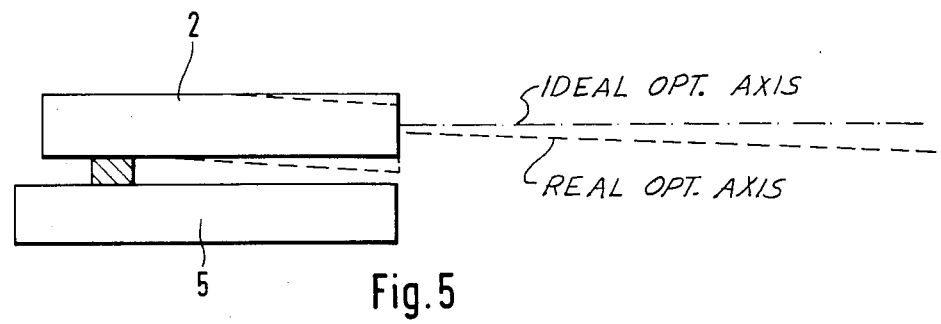
FIG. 5 illustrates the effect of gravitation on the optical axis and correction within the system.

FIG. 5 illustrates by reference character $F_g$ the situation in general involving particularly the force of gravity $F_g$ as it acts on the free end of the pivotal optic of the camera. As the elevation of the camera changes, the force of gravity changes direction vis-a-vis the camera. Added to that is accelleration and deceleration of the equipment as a whole, including the physical adjustment of the camera for fast tracking. These forces, when differing, have the tendency to, so to speak, bend the optical axis to a different degree.

Figure 6:
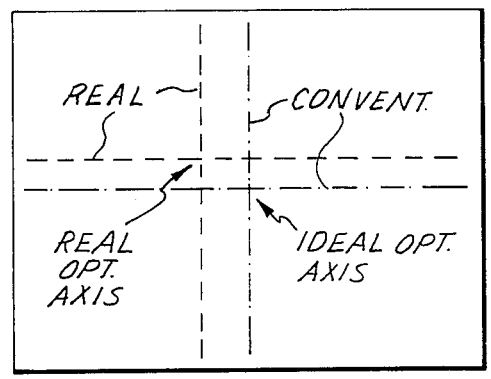
FIG. 6 illustrates in superimposed relationship a conventional and an inventive production of a cross hair.

A hair crossing which is usually optically included for purposes of marking the optical axis, is normally assumed to be independent form these forces but that is not quite correct. Therefore, a periscope-like projector 12 for the hair crossing is placed behind the primary mirror 3a to introduce such a hair line crossing into a projective path 13 for purposes of delineating by its intersection the optical axis. Owing to the mechanical forces of varying intensity a shift may occur between conventional crossings and the optical axis proper, so that, in fact, the conventionally projected crossing point will no longer indicate or represent the optical axis. The projection as per the invention introduces the hair cross into the ray path in such a manner that it will track the 'bent' optical axis. This is shown in FIGS. 5 and 6, the latter illustrating the relative shift that occurs between a conventional hair cross and the optical axis. If now the hair cross is shifted by operation of the invention, the imaged cross will track in real time the true axis. By means of a preparatory procedure, the displacement between the projected hair cross and the true optical axis for different sets of forces is determined, and the data is then stored in the MRC. These date will, in turn, be used for calculating corrections for the actual measuring data as they are used for temperatures and focusing control, as outlined above. This way one renders superfluous the so called star calibration which is usually necessary otherwise.

FIG. 4 illustrates in summary the MRC with inputs and outputs to the left is the source of input data such as the actual distance R to the simulated object. $A_2$ and $E_e$ are azimuth and elevation angle of the camera 2 on mount 5 as actually adjusted. $A_2'$ and $E_e'$ are the respective speeds of the adjustment operation. R' is the temporal derivative of the distance R, which represents the relative speed between that object and the tracking station. Other inputs come from the monitored system or systems (n) themselves. There is the focusing feedback (9 - FIG. 2), the temperatures $T_o$, $T_s$, and $T_i$ (FIG. 3), and the diaphragm feedback.

The MRC produces the focusing output that controls motor 8 and the analogous motor for diaphragm adjustment.

The invention is not limited to the embodiments described above but all changes and modifications thereof, not constituting departures from the spirit and scope of the invention, are intended to be included.

We claim:

1. Method for ensuring readiness of an optronic instrument that is used for tracking and guiding comprising the steps of:
   providing for tracking operations of simulated objects, including focusing and exposure control under a variety of different conditions including variable inertia forces and temperature variations expected to occur during a real mission;
   ascertaining deviations in the focusing and exposure control from desired and required values including ascertaining any exceeding of permissible ranges; and
   providing compensating data being used on a running basis during the real mission for purposes of corrective control of the focusing and exposure control.

2. Method as in claim 1, including adjusting steps, the method being practiced also during tests and simulated runs the ascertaining steps alternating with the adjusting steps during test and simulated runs for purposes of iteration, thereby preparing the equipment for a real mission in which the simulated test run conditions recur.

3. Method as in claim 1, including providing correction and compensating data, said data being used directly in real life missions for corrections whenever previously simulated conditions occur during a live mission

* * * * *